US009728802B2

(12) United States Patent
Mittelsteadt et al.

(10) Patent No.: US 9,728,802 B2
(45) Date of Patent: Aug. 8, 2017

(54) MICROMOLD METHODS FOR FABRICATING PERFORATED SUBSTRATES AND FOR PREPARING SOLID POLYMER ELECTROLYTE COMPOSITE MEMBRANES

(71) Applicants: Cortney Mittelsteadt, Wayland, MA (US); Avni Argun, Newton, MA (US); Castro Laicer, Watertown, MA (US); Jason Willey, Sudbury, MA (US)

(72) Inventors: Cortney Mittelsteadt, Wayland, MA (US); Avni Argun, Newton, MA (US); Castro Laicer, Watertown, MA (US); Jason Willey, Sudbury, MA (US)

(73) Assignee: GINER, INC., Newton, MA (US)

( * ) Notice: Subject to any disclaimer, the term of this patent is extended or adjusted under 35 U.S.C. 154(b) by 232 days.

(21) Appl. No.: 14/120,353

(22) Filed: May 14, 2014

(65) Prior Publication Data
US 2014/0342271 A1    Nov. 20, 2014

Related U.S. Application Data

(60) Provisional application No. 61/823,172, filed on May 14, 2013.

(51) Int. Cl.
*H01M 8/10* (2016.01)
*C25B 13/02* (2006.01)
(Continued)

(52) U.S. Cl.
CPC ......... *H01M 8/1065* (2013.01); *B29C 43/222* (2013.01); *C25B 13/02* (2013.01);
(Continued)

(58) Field of Classification Search
CPC .................................. H01M 8/1093
See application file for complete search history.

(56) References Cited

U.S. PATENT DOCUMENTS 3,282,875 A    11/1966 Connolly et al.
3,424,619 A    1/1969 Hever et al.
(Continued)

FOREIGN PATENT DOCUMENTS

WO    2004045750 A1    6/2004

OTHER PUBLICATIONS

Shibata et al., "Modified imprinting process using hollow microneedle array for forming through holes in polymers," Microelectronic Engineering, 88:2121-2125 (2011).
(Continued)

*Primary Examiner* — Patrick Ryan
*Assistant Examiner* — Christopher Domone
(74) *Attorney, Agent, or Firm* — Kriegsman & Kriegsman

(57) ABSTRACT

In polymer electrolyte membrane (PEM) fuel cells and electrolyzes, attaining and maintaining high membrane conductivity and durability is crucial for performance and efficiency. The use of low equivalent weight (EW) perfluorinated ionomers is one of the few options available to improve membrane conductivity. However, excessive dimensional changes of low EW ionomers upon application of wet/dry or freeze/thaw cycles yield catastrophic losses in membrane integrity. Incorporation of ionomers within porous, dimensionally-stable perforated polymer electrolyte membrane substrates provides improved PEM performance and longevity. The present invention provides novel methods using micromolds to fabricate the perforated polymer electrolyte membrane substrates. These novel methods using micromolds create uniform and well-defined pore structures. In addition, these novel methods using micromolds described herein may be used in batch or continuous processing.

34 Claims, 12 Drawing Sheets

(51) Int. Cl.
    *B29C 67/00*     (2017.01)
    *H01M 8/1065*     (2016.01)
    *B29C 43/22*     (2006.01)
    *H01M 8/1069*     (2016.01)
    *C25B 13/08*     (2006.01)
    *B29K 81/00*     (2006.01)
    *B29K 105/00*     (2006.01)
    *B29L 31/00*     (2006.01)
    *B29L 31/34*     (2006.01)
    *H01M 8/1018*     (2016.01)
    *B29C 43/28*     (2006.01)

(52) U.S. Cl.
    CPC ........... *C25B 13/08* (2013.01); *H01M 8/1069* (2013.01); *B29C 43/28* (2013.01); *B29K 2081/06* (2013.01); *B29K 2105/0002* (2013.01); *B29K 2105/0073* (2013.01); *B29K 2105/256* (2013.01); *B29K 2905/08* (2013.01); *B29K 2995/0005* (2013.01); *B29K 2995/0027* (2013.01); *B29K 2995/0097* (2013.01); *B29L 2031/3468* (2013.01); *B29L 2031/755* (2013.01); *H01M 2008/1095* (2013.01); *H01M 2300/0094* (2013.01); *Y02P 70/56* (2015.11)

(56) References Cited

U.S. PATENT DOCUMENTS

| | | |
|---|---|---|
| 3,972,727 A | 8/1976 | Cohn |
| 4,215,183 A | 7/1980 | MacLeod |
| 4,470,889 A | 9/1984 | Ezzell et al. |
| 4,478,695 A | 10/1984 | Ezzell et al. |
| 5,569,855 A | 10/1996 | Schomburg et al. |
| 6,350,389 B1 | 2/2002 | Fujishima et al. |
| 6,492,431 B1 | 12/2002 | Cisar |
| 6,500,319 B2 | 12/2002 | LaConti et al. |
| 6,635,384 B2 | 10/2003 | Bahar et al. |
| 6,793,711 B1 | 9/2004 | Sammells |
| 7,521,144 B2 | 4/2009 | Shimohira et al. |
| 7,708,544 B2 | 5/2010 | Pricone |
| 7,807,063 B2 | 10/2010 | Liu et al. |
| 7,867,602 B2 * | 1/2011 | Hsu .................. G02B 1/105 428/141 |
| 7,867,669 B2 | 1/2011 | Liu et al. |
| 7,947,405 B2 | 5/2011 | Mittelsteadt et al. |
| 2002/0132482 A1 * | 9/2002 | Chou .................. B29C 43/003 438/692 |
| 2002/0182482 A1 | 12/2002 | Hockaday et al. |
| 2003/0138656 A1 | 7/2003 | Sparks |
| 2004/0126638 A1 | 7/2004 | Chen et al. |
| 2005/0026030 A1 | 2/2005 | Mardilovich et al. |
| 2005/0074651 A1 | 4/2005 | Kidai et al. |
| 2005/0095486 A1 | 5/2005 | Hamamoto et al. |
| 2005/0263452 A1 | 12/2005 | Jacobson |
| 2006/0065521 A1 | 3/2006 | Liu et al. |
| 2006/0065522 A1 | 3/2006 | Liu et al. |
| 2006/0180796 A1 | 8/2006 | Adachi et al. |
| 2006/0183011 A1 | 8/2006 | Mittelsteadt et al. |
| 2009/0253016 A1 | 10/2009 | Katayama |
| 2010/0065490 A1 * | 3/2010 | Balster .................. B01D 61/46 210/483 |
| 2011/0104474 A1 * | 5/2011 | Liu .................. C25B 13/02 428/322.7 |
| 2012/0100463 A1 * | 4/2012 | Hasegawa .............. B82Y 30/00 429/535 |

OTHER PUBLICATIONS

Yanagishita et al., "Polymer through-hole membrane fabricated by nanoimprinting using metal molds with high aspect ratios," J. Vac. Sci. Technol. B, 25(4):L35-L38 (2007).

Schift et al., "Perforated polymer membranes fabricated by nanoimprint," Microelectronic Engineering, 83:873-875 (2006).

Heckele et al., "Review on micro molding of thermoplastic polymers," J. Micromech. Microeng., 14:R1-R14 (2004).

* cited by examiner

MICROMOLD METHODS FOR FABRICATING PERFORATED SUBSTRATES AND FOR PREPARING SOLID POLYMER ELECTROLYTE COMPOSITE MEMBRANES

CROSS-REFERENCE TO RELATED APPLICATIONS

The present application claims the benefit under 35 U.S.C. 119(e) of U.S. Provisional Patent Application No. 61/823,172, filed May 14, 2013, the disclosure of which is incorporated herein by reference.

FEDERALLY SPONSORED RESEARCH OR DEVELOPMENT

This invention was made with government support under DOE SBIR Phase III Xlerator Program Federal Grant and Cooperative Agreement No. DE-EE0004533 entitled "Dimensionally Stable High Performance Membrane" awarded by the Department of Energy. The government has certain rights in the invention.

FIELD OF THE INVENTION

The present invention relates, in part, to methods for fabricating perforated substrates which perforated substrates may be used in applications including, but not limited to, electrochemical cells, such as fuel cells and electrolyzers. The present invention also relates, in part, to methods for preparing solid polymer electrolyte composite membranes including such perforated substrates.

BACKGROUND OF THE INVENTION

Incorporating ionomers within highly porous, dimensionally-stable polymer electrolyte membrane (PEM) substrates increases the performance and longevity of PEM devices, such as fuel cells and electrolyzers. GORE-TEX® expanded polytetrafluoroethylene (PTFE) is an example of a commonly-used polymer electrolyte membrane substrate containing a fluorinated, microporous structure. However, GORE-TEX® expanded PTFE may have non-uniform porosity, through-holes that are not well-defined, and a low degree of porosity, which negatively impact fuel cell and electrolyzer performance. Aluminum oxide membranes are another example of dimensionally-stable polymer electrolyte membrane substrates with high porosity and straight-through pores, but they are often brittle, susceptible to crack formation under stress, and difficult to apply in a continuous, roll-to-roll type manufacturing process. The thickness of aluminum oxide membranes is also 100 microns or higher, thus making them impractical for applications that require ultra-thin (~25 micron or less) membrane substrates.

Some previous attempts have been made to fabricate membranes with patterned and highly dense pores using thermal processing methods (see, for example, U.S. Pat. No. 7,708,544 B2, inventor Pricone, issued May 4, 2010; Schift et al., "Perforated polymer membranes fabricated by nanoimprint," *Microelectronic Engineering*, 83 (4-9):873-875 (2006); Shibata et al., "Modified imprinting process using hollow microneedle array for forming through holes in polymers," *Microelectronic Engineering*, 88(8):2121-2125 (2011); and Yanagishita et al., "Polymer through-hole membrane fabricated by nanoimprinting using metal molds with high aspect ratios," *Journal of Vacuum Science & Technology B: Microelectronics and Nanometer Structures*, 25 (4):L35 (2007), all of which are incorporated herein by reference). Membranes using straight-through pores produced by pulsed laser drilling have also been fabricated for use in fuel cell or electrolyzer applications (see, for example, U.S. Pat. No. 7,521,144 B2, inventors Shimohira et al., issued Apr. 21, 2009; and U.S. Patent Application Publication No. US 2009/0253016 A1, inventor Katayama, published Oct. 8, 2009, both of which are incorporated herein by reference). Another method to form pores in membrane substrates is the use of photolithography wherein a photoresist is cast on a material, followed by directing UV-light over a patterned mask in order to develop select areas. Upon exposure of the non-masked (unprotected) areas to chemicals, the material is chemically etched until the desired porosity is obtained. However, both chemical etching and optical ablation (e.g. laser drilling) methods often suffer from severely tapered pores and are also difficult to adapt to continuous and rapid roll-to-roll manufacturing processes. Additionally, optical ablation methods often experience an inability to focus the laser uniformly through the entire film thickness. Laser drilling is also limited to aromatic polymers, as the focused light from the laser will not be absorbed in sufficient amounts by non-aromatic polymers with the light simply passing through the material.

Other documents that may be of interest include U.S. Pat. No. 7,947,405 B2, inventors Mittelsteadt et al., issued May 24, 2011; U.S. Pat. No. 7,867,669 B2, inventors Liu et al, issued Jan. 11, 2011; and Heckele et al., "Review on micro molding of thermoplastic polymers," *Journal of Micromechanics and Microengineering*, 14 (3):R1-R14 (2004), all of which are incorporated herein by reference.

SUMMARY OF THE INVENTION

It is an object of the present invention to provide a new method for preparing a perforated substrate.

According to one aspect of the invention, there is provided a method of preparing a perforated substrate, the method comprising the steps of (a) providing a layer of material; and (b) using a micromold to form at least one perforation extending entirely through the layer of material, the micromold comprising at least one micropillar, the micropillar having a diameter of about 1-150 microns.

In other, more detailed features of the invention, the at least one micropillar may have a height of about 1-200 microns.

In other, more detailed features of the invention, the micromold may have a micropillar density of about 20-60%.

In other, more detailed features of the invention, the micromold may comprise a plurality of micropillars, each of the micropillars may have a diameter of about 1-150 microns and a height of about 1-200 microns, and the micromold may have a micropillar density of about 20-60%.

In other, more detailed features of the invention, the layer of material may be a solid layer of material and the micromold using step may comprise pressing the at least one micropillar through the solid layer of material and heating the solid layer of material to an elevated temperature, whereby a perforated substrate may be formed.

In other, more detailed features of the invention, the solid layer of material may be selected from a thermoplastic material and a thermoset material.

In other, more detailed features of the invention, the providing step may comprise casting or laminating the solid layer of material onto a carrier.

In other, more detailed features of the invention, the solid layer of material may have a thickness of about 1-200 microns.

In other, more detailed features of the invention, the solid layer of material may have a glass transition temperature and the carrier may have a glass transition temperature and the glass transition temperature of the carrier may be higher than the glass transition temperature, the solid layer of material so that the carrier does not flow and/or combine with the solid layer of material during said heating.

In other, more detailed features of the invention, the solid layer of material may be directly on top of the carrier.

In other, more detailed features of the invention, the providing step may comprise casting or laminating one or more support layers onto the carrier under the solid layer of material.

In other, more detailed features of the invention, the one or more support layers may have a total thickness of about 1-50 microns.

In other, more detailed features of the invention, the pressing may comprise pressing the at least one micropillar through the solid layer of material at a pressure of about 10-700 psi, preferably about 250-350 psi.

In other, more detailed features of the invention, the solid layer of material may have a glass transition temperature and the micromold using step may further comprise decreasing the temperature to a temperature below the glass transition temperature of the solid layer of material while the at least one micropillar is pressed through the solid layer of material.

In other, more detailed features of the invention, the micromold using step may further comprise removing the micromold from the solid layer of material.

In other, more detailed features of the invention, the thermoplastic material may be selected from the group consisting of polysulfone, polyether sulfone, polystyrene, polyphenylene oxide, polycarbonate, polyphenylene sulfide, polyether ether ketone, polyamides (nylon) polyimides, acrylonitrile-butadiene-styrene copolymers (ABS), poly(m-ethyl methacrylate), polyethylene, polypropylene, poly vinyl chloride, poly vinyl alcohol, fluorocarbon elastomers and fluorine based resins.

In other, more detailed features of the invention, the thermoset material may be selected from the group consisting of polyimide, polyether imide, polyisoprene, pre-vulcanized rubber, and polyurethanes.

In other, more detailed features of the invention, the providing and using steps may be performed batch-wise.

In other, more detailed features of the invention, the providing and using steps may be performed as part of a continuous, roll-to-roll process.

In other, more detailed features of the invention, the layer of material may be a layer of a UV-curable liquid monomer solution and the micromold-using step may comprise causing the UV-curable liquid monomer solution to cure while pressing the at least one micropillar through the layer of the UV-curable liquid monomer solution, whereby a perforated substrate may be formed.

In other, more detailed features of the invention, the providing step may comprise depositing the layer of UV-curable liquid monomer solution onto a carrier.

In other, more detailed features of the invention, the UV-curable liquid monomer, solution may comprise a liquid monomer and a UV-curing initiator.

In other, more detailed features of the invention, the liquid monomer may be at least one member selected from the group consisting of acrylates, thiol-enes, epoxy acrylates, epoxy silicon, polyimide precursors, urethane acrylates, and fluoroacrylates, and the UV-curing initiator may be at least one member selected from the group consisting of phenones, ethanones, phenyl ketones, and phosphineoxides.

In other, more detailed features of the invention, the layer of the UV-curable liquid monomer solution may have a thickness of about 1-200 microns.

In other, more detailed features of the invention, the providing step may comprise depositing one or more support layers onto a carrier and then depositing the UV-curable liquid monomer solution onto the one or more support layers.

In other, more detailed features of the invention, the one or more support layers may have a total thickness of about 1-50 microns.

In other, more detailed features of the invention, the micromold may be a UV-transparent micromold, and the curing step may comprise curing the UV-curable liquid monomer solution with UV light directed into the UV-curable liquid monomer solution through the UV-transparent micromold.

In other, more detailed features of the invention, the carrier may be a UV-transparent carrier, and the curing step may comprise curing the UV-curable liquid monomer solution with UV light directed into the UV-curable liquid monomer solution through the UV-transparent carrier.

In other, more detailed features of the invention, the micromold using step may further comprise removing the micromold from the perforated substrate.

In other, more detailed features of the invention, the providing and using steps may be performed batch-wise.

In other, more detailed features of the invention, the providing and using steps may be performed as part of a continuous, roll-to-roll process.

According to another aspect of the invention, there is provided a method of preparing a perforated substrate, the method comprising the steps of (a) providing a micromold, the micromold comprising at least one micropillar, the micropillar having a diameter of about 1-150 microns; (b) depositing a layer of a dissolved polymer solution over the micromold and around the at least one micropillar, whereby a coated micromold is formed; and (c) submerging the coated micromold in an inversion solvent bath, whereby the polymer solidifies on the micromold around the micropillar to form a perforated substrate.

In other, more detailed features of the invention, the at least one micropillar may have a height of about 1-200 microns.

In other, more detailed features of the invention, the micromold may have a micropillar density of about 20-60%.

In other, more detailed features of the invention, the micromold may comprise a plurality of micropillars, each of the micropillars may have a diameter of about 1-150 microns and a height of about 1-200 microns, and the micromold may have a micropillar density of about 20-60%.

In other, more detailed features of the invention, the method may further comprise removing the micromold from the perforated substrate.

In other, more detailed features of the invention, the dissolved polymer solution may comprise at least one polymer dissolved in at least one solvent, and the at least one solvent may constitute about 2-50% by weight of the combined weight of the at least one polymer and the at least one solvent.

In other, more detailed features of the invention, the at least one polymer may be at least one member selected from the group consisting of polysulfones, polyphenylene oxide, polyphenylene sulfide, and polyether ether ketones alcohols, and the at least one solvent may be at least one member selected from the group consisting of alcohols, polar aprotic solvents, N-methyl pyrrolidone, dimethyl acetamide, dimethyl sulfoxide, and non-polar organic solvents.

In other, more detailed features of the invention, the providing, depositing and submerging steps may be performed batch-wise.

In other, more detailed features of the invention, the providing, depositing and submerging steps may be performed as part of a continuous, roll-to-roll process.

According to another aspect of the invention, there is provided a method of preparing a solid polymer electrolyte composite membrane, the method comprising the steps of (a) preparing a perforated substrate according to any of the methods discussed above; and (b) at least partially filling the at least one perforation with a solid polymer electrolyte.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

The present invention is directed, at least in part, at various methods for fabricating perforated substrates and for preparing solid polymer electrolyte composite membranes that include such perforated substrates. Such solid polymer electrolyte composite membranes may be used, for example, in PEM fuel cells and electrolyzers.

Figure 1:
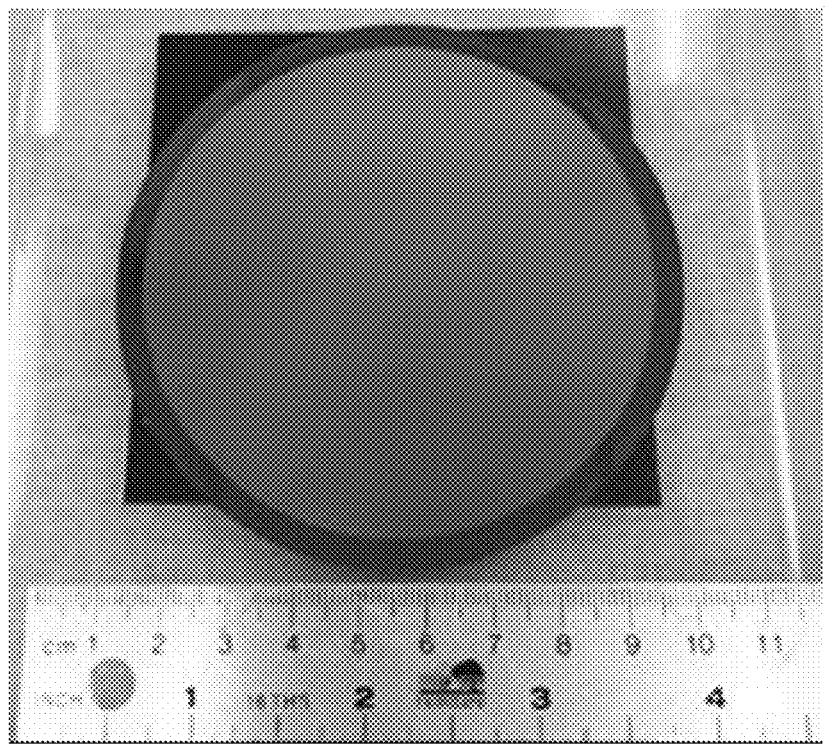
FIG. 1 is a top view image of one embodiment of a micromold according to the teachings of the present invention.
Figure 2:
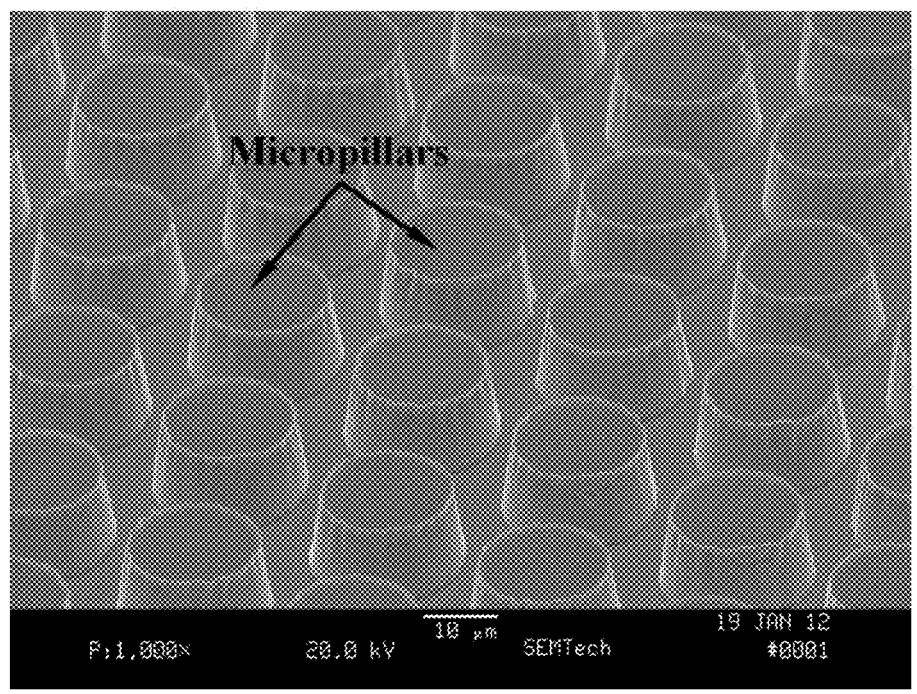
FIG. 2 is a magnified perspective image, obtained with a scanning electron microscope (SEM) (1000× magnification), of the micromold of FIG. 1.
Figure 3:
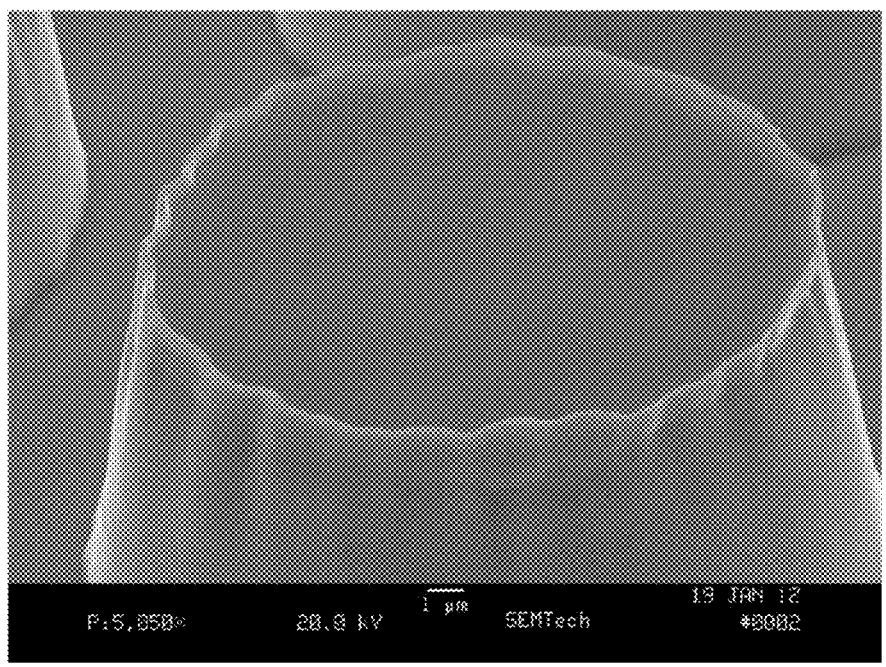
FIG. 3 is a magnified perspective image, obtained with an SEM (5050× magnification), of one micropillar of the micromold of FIG. 1.
Figure 4:
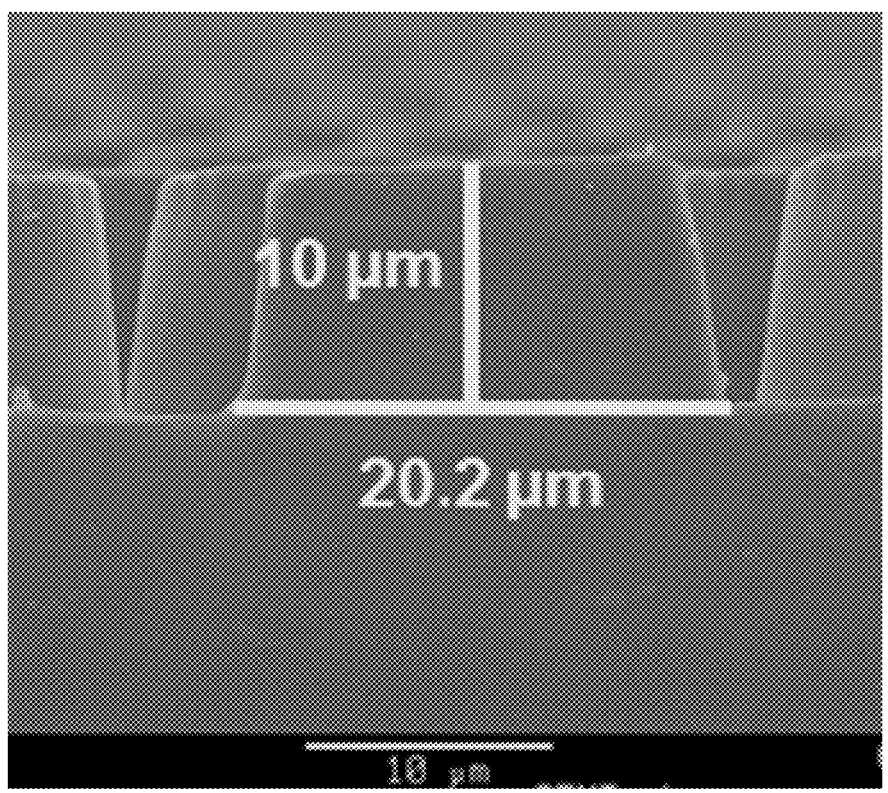
FIG. 4 is a magnified cross-sectional image, obtained with an SEM (2000× magnification), of the micromold of FIG. 1.
Figure 5:
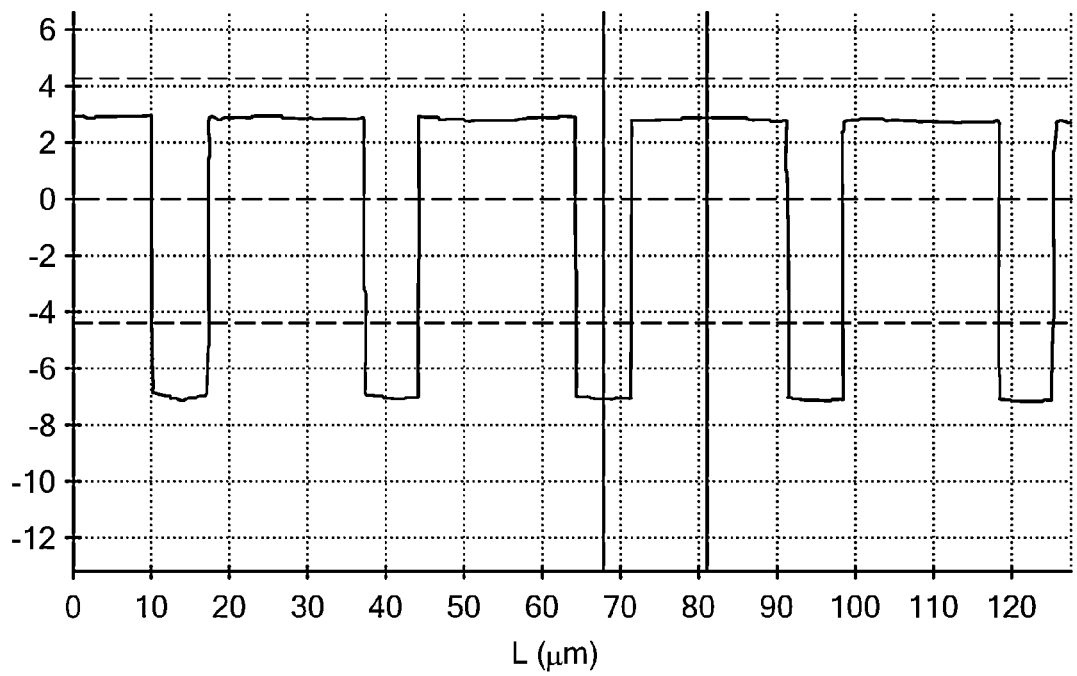
FIG. 5 is a contact profilometry scan showing the topography of the micromold of FIG. 1.

The methods of the present invention for fabricating perforated substrates typically involve the use of a micromold. For purposes of the present invention, the term "micromold" refers to a mold containing a plurality of "micropillars" suitable for perforating a substrate. An example of a micromold is shown in FIG. 1. For purposes of the present invention, the term "micropillar" refers to one or more protrusions on the surface of a micromold that may be used to form one or more corresponding perforations in a substrate. A plurality of micropillars may be provided on the surface of a micromold to create a patterned set of perforations in a substrate. Examples of micropillars are shown in FIGS. 2 through 4. The micropillars of the present invention may consist of or comprise any shape, but preferred transverse cross-sectional shapes of the micropillars are round or hexagonal. Preferably, the micropillars of the present invention have a diameter of about 1-150 microns so that corresponding perforations formed in the substrate are about 1-150 microns. In addition, the micropillars of the present invention preferably have a height of about 1-200 microns. The micropillars may be uniformly distributed throughout the surface of the micromold or may be more densely distributed in selected areas on the micromold surface. Due, at least in part, to the shape and/or distribution of micropillars on the micromold, the use of such micromolds in accordance with the teachings of the present invention can achieve a highly-controlled pore geometry and/or density. Preferably, the micropillars are arranged on the micromold in a micropillar density of about 20-60% of the surface area of the micromold so that the porosity of the perforated substrate made with the micromold is about 20-60%.

The present invention includes three novel methods of using micromolds to fabricate perforated substrates. The three novel methods described herein include: (1) thermal perforation, (2) UV-curable, and (3) solvent-based. The above-mentioned thermal perforation method uses a micromold to perforate a thermoplastic or thermoset material used as the substrate while such thermoplastic or thermoset material is at an elevated temperature (i.e. above the glass transition temperature). The above-mentioned UV-curable method uses a micromold to form the desired pattern in a UV-curable liquid monomer solution, which is then cured/polymerized using UV light. The above-mentioned solvent-based method uses a micromold to form the pattern in a dissolved polymer solution that is then placed in an inversion solvent bath wherein the polymer solidifies on the micromold in the desired pattern. The three perforation methods identified above may be done in batch processing or may be adapted to continuous, roll-to-roll processing. Additional information about each of these three perforation methods is provided below.

According to one embodiment, the thermal perforation method of the present invention may generally comprise five steps: (1) casting or laminating a thermoplastic or thermoset material onto a carrier, (2) pressing the micromold against the thermoplastic/thermoset material at a set pressure, (3) heating the thermoplastic/thermoset material while under pressure from the micromold, (4) cooling the thermoplastic/thermoset material while under pressure from, the micromold, and (5) removing the micromold from the thermoplastic/thermoset material. The steps of the aforementioned thermal perforation method may be performed in a batch method or in a continuous, roll-to-roll method.

More specifically, the first step of the above-identified thermal perforation method may comprise casting or laminating a thermoplastic or thermoset layer onto a carrier. The thickness of the thermoplastic or thermoset layer is preferably less than the height of the pillars of the micromold. The preferred range of thicknesses for the thermoplastic or thermoset layer may be about 1-200 microns. The carrier preferably has a higher glass transition temperature than the glass transition temperature of the thermoplastic/thermoset material being perforated so that the carrier does not flow and/or combine with the thermoplastic/thermoset material during the heating step.

Alternatively, the first step may comprise casting or laminating one or more support layers onto the carrier, followed by casting or laminating the thermoplastic or thermoset material onto the support layer(s). The preferred range of thicknesses for the support layer(s) may be about 1-50 microns.

The second step of the subject thermal perforation method may be to press the micromold against the thermoplastic or thermoset material at a set pressure. The preferred set pressure range of the micromold against the thermoplastic/thermoset material may be about 10-700 psi, preferably about 250-350 psi.

The third step of the subject thermal perforation method may comprise heating the thermoplastic or thermoset material, while the micromold is pressed against the thermoplastic/thermoset material at the set pressure, from ambient temperature to a peak temperature. The preferred peak temperature is above the glass transition temperature of the thermoplastic or thermoset material. At the peak temperature, the pattern of pores provided by the micromold may be formed in the thermoplastic/thermoset material and in the support layer(s) as those layers soften and flow into the micromold. Alternatively, only the thermoplastic/thermoset layer may flow at the peak temperature whereas the support layer(s) may remain solid and may not flow into the pattern of pores provided by the micromold.

The fourth step of the subject thermal perforation method may comprise decreasing the temperature while the micromold remains pressed into the thermoplastic/thermoset layer and/or support layer(s) at the set pressure. Preferably, the thermoplastic or thermoset material may be cooled to a temperature that is below the glass transition temperature of the thermoplastic or thermoset material.

The fifth step may comprise removing the micromold from thermoplastic or thermoset material. The micromold may have a pre-applied release or anti-stick layer (e.g., TEFLON® PTFE, perfluorodecyltrichlorosilane (FDTS)) to aid in the removal of the thermoplastic or thermoset material from the micromold.

Figure 6:
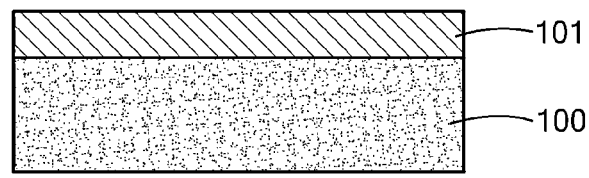
FIG. 6 is a schematic section view of a first embodiment of a multilayer structure prepared by performing the first step of the thermal perforation method of the present invention.

Referring now to FIG. 6, the first step of the above-described thermal perforation method may be shown by the casting or laminating of a substrate layer 101 onto a carrier layer 100. Carrier layer 100 may comprise one or more high temperature, high strength, and/or flexible polymers, such as one or more polyesters (e.g., polyethylene terephthalate (PET)) or polyimides, and may be approximately 2-5 mil thick. Carrier layer 100 preferably has a higher glass transition temperature than the glass transition temperature of substrate layer 101 so that carrier layer 100 does not flow and/or combine with substrate layer 101 during the heating step that takes place later. Substrate layer 101 may comprise one or more thermoplastic materials or one or more thermoset materials. The one or more thermoplastic materials may include aromatic thermoplastics and non-aromatic thermoplastics. Examples of aromatic thermoplastics include, but are not limited to, polysulfone, polyether sulfone, polystyrene, polyphenylene oxide, polycarbonate, polyphenylene sulfide, polyether ether ketone, polyamides (nylon), polyimides, and acrylonitrile-butadiene-styrene copolymers (ABS). Examples of non-aromatic thermoplastics include, but are not limited to, poly(methyl methacrylate), polyethylene, polypropylene, poly vinyl chloride, poly vinyl alcohol, fluorocarbon elastomers and fluorine based resins (e.g., PTFE, ethylene tetrafluoroethylene (ETFE)). Examples of thermoset materials may include, but are not limited to, polyimide, polyether imide, polyisoprene and rubber (prior to vulcanization), and polyurethanes. The thickness of substrate layer 101 is preferably less than the height of the pillars in the micromold. The preferred range of thickness for substrate layer 101 is about 1-200 microns.

Figure 7:
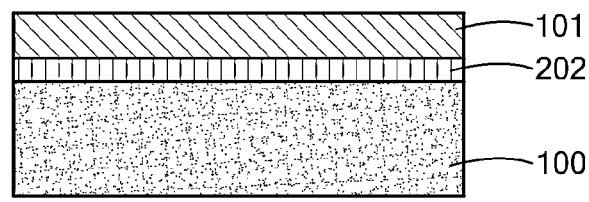
FIG. 7 is a schematic section view of a second embodiment of a multilayer structure prepared by performing the first step of the thermal perforation method of the present invention.

In an alternative embodiment, more than one layer may be cast or laminated onto the carrier. For example, referring now to FIG. 7, support layer 202 may be cast or laminated between carrier layer 100 and substrate layer 101. Support layer 202, which may be a single layer or a plurality of layers, may comprise a perfluorosulfonated polymer layer (PFSA) and/or a fluorinated release-aid layer, such as poly vinylidene fluoride (PVDF). The preferred thickness of support layer 202 is about 1-50 microns. Support layer 202 may or may not be perforated during the heating step that takes place later. If support layer 202 is to be perforated, then the glass transition temperature of support layer 202 is preferably less than the peak temperature during the heating step, and the combined thickness of substrate layer 101 and support layer 202 is preferably less than the height of the micropillars.

Figure 8:
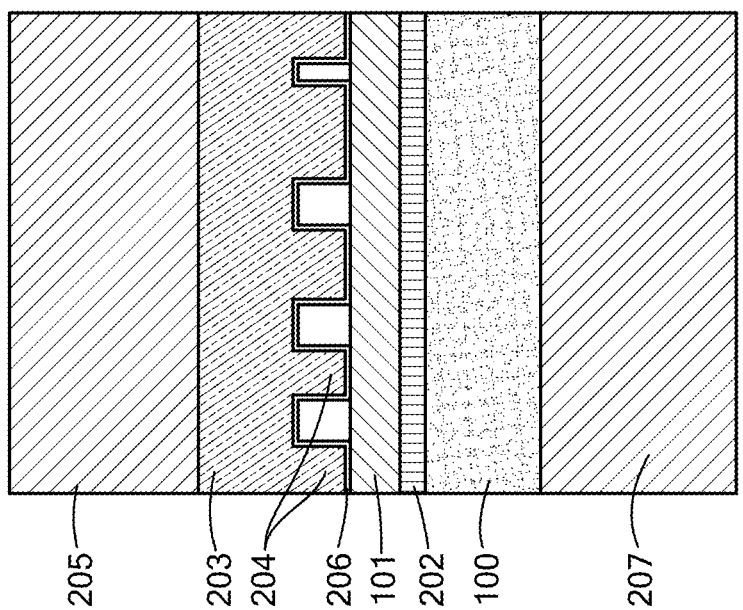
FIG. 8 is a schematic section view showing the second step of the thermal perforation method of the present invention starting to be performed on the multilayer structure of FIG. 7.

Referring now to FIG. 8, there is shown the second step of the above-described thermal perforation method, namely, the pressing of a micromold against the substrate layer at a set pressure. More specifically, as shown in FIG. 8, micromold 203 is placed on top of substrate layer 101. Micromold 203 may comprise micropillars 204 that may be of any shape, but are preferably of round or hexagonal transverse cross-sectional shape. Micropillars 204 may or may not be of uniform size. Additionally, the distribution of micropillars 204 may or may not be uniform or symmetrical. A mold release layer 206, comprising an anti-stick layer (e.g. FDTS, TEFLON® PTFE), may be applied to the contacting surface of micromold 203. A first pressing plate 207 may be placed underneath carrier layer 100, and a second pressing plate 205 may be placed on top of micromold 203. The pressure between pressing plates 205 and 207 is preferably high enough (e.g., greater than 10 psi) that micromold 203 perforates substrate layer 101 during a subsequent heating step. In addition, the pressure should be low enough (i.e., less than 700 psi) that micropillars 204 do not deform. A preferred set pressure range of micromold 203 against substrate layer 101 is about 250-350 psi.

Figure 9:
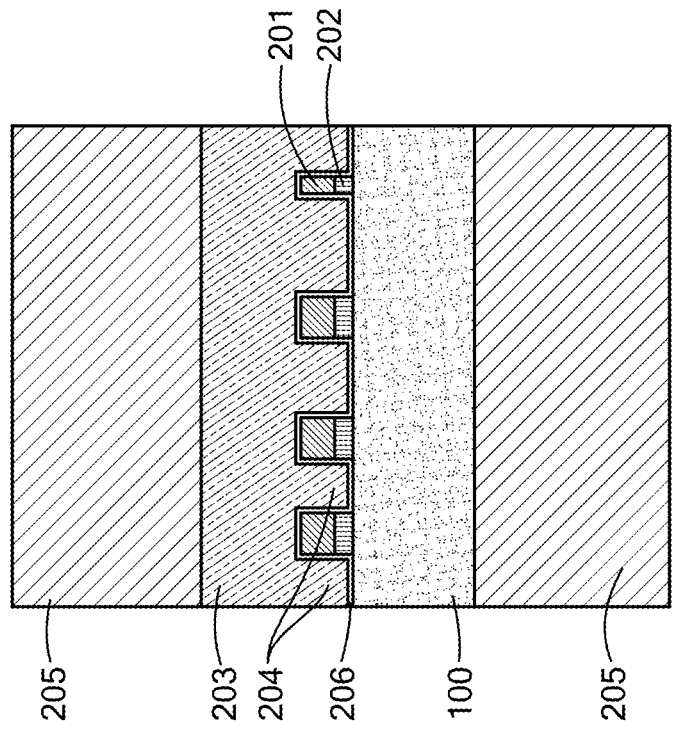
FIG. 9 is a schematic section view showing the third step of the thermal perforation method of the present invention being performed on the multilayer structure of FIG. 7.

Referring now to FIG. 9, there is shown the third step of the above-described thermal perforation method, namely, the heating of the substrate layer while micromold 203 is pressed thereagainst, thereby transforming substrate layer 101 into substrate layer 201. During this step, pressing plate 205 and/or pressing plate 207 will ramp up in temperature from ambient temperature to a peak temperature. The peak temperature should be above the glass transition temperature of the substrate layer 201 so that substrate layer 201 will easily flow and form the shape provided by micromold 203. The peak temperature should not exceed a temperature that will cause degradation (i.e., breakdown into smaller polymer chains and loss of properties) of substrate layer 201. A preferred range of peak temperatures is about 1-150° C. above the glass transition temperature of substrate layer 201. Once the peak temperature is reached, micromold 203 will remain pressed against substrate layer 201 at the set pressure and peak temperature for a period of time, which is preferably about 1-30 minutes. FIG. 9 illustrates the deformation of substrate layer 201 and support layer 202 by micromold 203 as the temperature reaches the peak temperature. Alternatively, in another embodiment, micromold 203 may only perforate substrate layer 201 and not support layer 202.

After being held at the peak temperature for a time within the preferred range, the fourth step of the subject thermal perforation method is to ramp down the temperature while micromold 203 remains pressed against substrate layer 201 at the set pressure. Substrate layer 201 should be cooled to a temperature that is below its glass transition temperature, which may be less than about 120° C. Once substrate layer 201 reaches its desired cool down temperature, the fifth step of the subject thermal perforation method is to remove micromold 203 from substrate layer 201.

Figure 10:
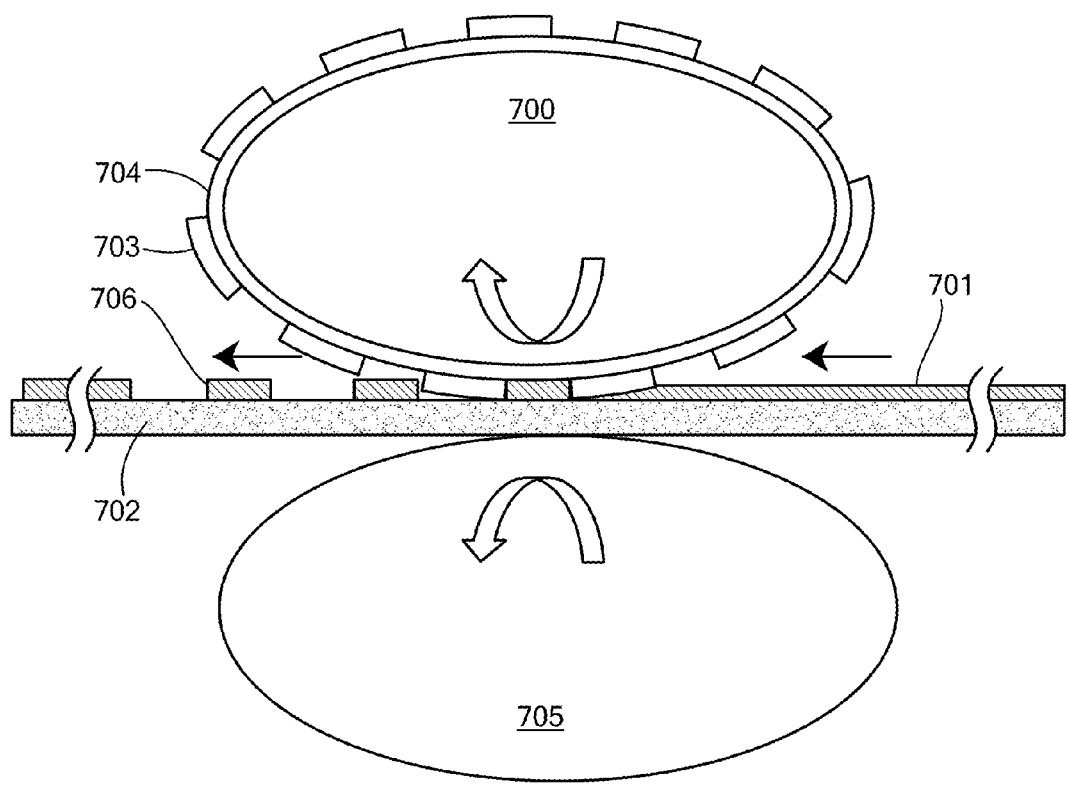
FIG. 10 is a schematic section view showing one embodiment of the thermal perforation method of the present invention being performed in a continuous roll-to-roll mode.

In another embodiment, the subject thermal perforation method may be performed in a continuous, roll-to-roll fabrication process. Referring now to FIG. 10, a carrier layer 702, similar to carrier layer 100, may be coated with a substrate layer 701, similar to substrate layer 101, and may be fed continuously between a first rotating conveyer 700 and a second rotating conveyer 705. The distance between first rotating conveyer 700 and second rotating conveyer 705 may be fixed so that, as carrier 702 and substrate layer 701 are fed through, a pressure in a preferred range of about 250-300 psi, may be applied between micropillars 703 of micromold 704 and substrate layer 701. Once micropillars 703 are pressed against substrate layer 701 at the set pressure, first rotating conveyer 700 and/or second rotating conveyer 705 heat carrier layer 702 and substrate layer 701 to a peak temperature (i.e., to a temperature above the glass transition temperature of substrate layer 701). While the system is held at the peak temperature, micropillars 703 press through the softened substrate layer 701 and make contact with carrier layer 702. Next, first rotating conveyer 700 and/or second rotating conveyer 705 cool carrier layer 702 and substrate layer 701 so that substrate layer 701 solidifies. Once cooled, the resulting perforated substrate 706 (formed from substrate layer 701) and carrier layer 702 exit micromold 704.

As noted above, an alternative method to the foregoing thermal perforation method is an ultraviolet (UV) light cure method. This method may comprise four steps: (1) depositing UV-curable liquid monomer solution (i.e., the layer that will eventually become the perforated substrate) onto a carrier, (2) pressing the micromold through the liquid monomer, (3) directing UV light into the UV-curable liquid monomer solution so that the liquid monomer polymerizes (i.e., UV-light cure), and (4) removing the micromold from the UV-cured polymer. The steps of the subject UV-light cure method may be performed in a batch method or in a continuous, roll-to-roll method.

More specifically, the first step of the subject UV-curable method may comprise depositing a UV-curable liquid monomer solution onto a suitable carrier. The UV-curable liquid monomer solution may comprise a liquid monomer combined with a UV-curing initiator. A preferred range of thickness for the deposited UV-curable liquid monomer solution may be about 1-200 microns. The manner of depositing the UV-curable liquid monomer solution onto the carrier may comprise, for example, blade coating, rod coating, or slot-die coating.

Alternatively, the first step of the subject UV-curable method may comprise depositing one or more suitable support layers onto the carrier, followed by depositing the UV-curable liquid monomer solution onto the support layer(s). A preferred range of thickness for the support layer(s) is about 1-50 microns.

The second step of the subject UV-curable method may comprise pressing a micromold through the UV-curable liquid monomer solution and/or support layer(s) wherein the micropillars of the micromold are in contact with the carrier.

A preferred range of thickness for the deposited liquid monomer may be about 1-200 microns.

The third step of the subject UV-curable method may comprise curing the UV-curable liquid monomer solution with UV light. UV light may be directed into the UV-curable liquid monomer solution either through a UV-transparent micromold or through a UV-transparent carrier. A preferred wavelength of UV light may be about 340 nm. The UV light at the desired wavelength may be directed into the UV-curable liquid monomer solution for a time necessary to polymerize or solidify the UV-curable liquid monomer solution. A preferred time period for directing the UV light into the UV-curable liquid monomer solution may be about 0.5-60 seconds.

The fourth step of the subject UV light cure method may comprise removing the micromold from the perforated substrate that was formed by the UV-curing method (i.e., the UV-curable liquid monomer solution that was cured with the UV light). The micromold may have a pre-applied release or anti-stick layer (e.g., TEFLON® PTFE, FDTS) to aid in the removal of the perforated substrate from the micromold.

Figure 11:
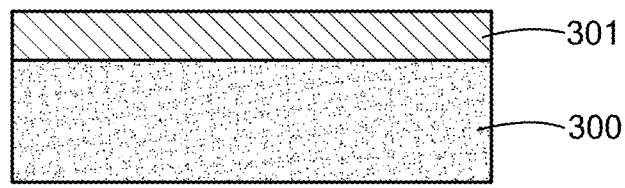
FIG. 11 is a schematic section view of a first embodiment of a multilayer structure prepared by performing the first step of the UV-curable method of the present invention.

Referring now to FIG. 11, the first step of the subject UV-curable method may be shown by the deposition of a layer 301 of a UV-curable liquid monomer solution onto a carrier 300. A preferred range of thickness for layer 301 is about 1-200 microns. The UV-curable liquid monomer solution used to form layer 301 may comprise a liquid monomer in combination with a UV-curing initiator. Examples of suitable liquid monomers may include, but are not limited to, acrylates, thiol-enes, epoxy acrylates, epoxy silicon, polyimide precursors, urethane acrylates, and fluoroacrylates. Examples of suitable UV-curing initiators to be pre-mixed with the liquid monomer may include, but are not limited to, phenones, ethanones, phenyl ketones, and phosphineoxides. The liquid monomer may be pre-mixed with a UV-curing initiator in a preferred range of about 2-5% by weight of the UV-curing initiator. Carrier 300 may comprise other high-strength and flexible polymers, such as polyesters (e.g., PET, MYLAR® stretched PET) or polyimides, which may be preferably about 2-5 mil thick. The manner of depositing the UV-curable liquid monomer solution onto carrier 300 may comprise, for example, blade coating, rod coating, wire coating, or slot-die coating.

Figure 12:
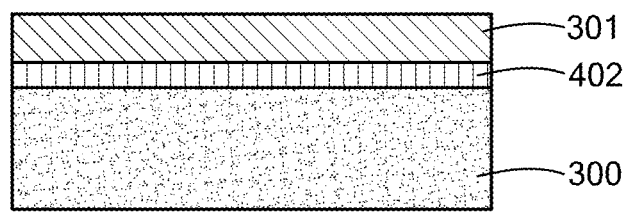
FIG. 12 is a schematic section view of a second embodiment of a multilayer structure prepared by performing the first step of the UV-curable method of the present invention.

In an alternative embodiment, more than one layer may be deposited onto carrier 300. For example, referring now to FIG. 12, support layer 402 may be deposited onto carrier 300, and layer 301 deposited on support layer 402. Support layer 402 may comprise a perfluorosulfonated polymer layer (PFSA) or a fluorinated release-aid layer (e.g., polyvinylidene fluoride (PVDF)) with a thickness that may be about 1-50 microns. Support layer 402 may consist of a single layer or may comprise a plurality of layers. Support layer 402 is preferably not perforated during the UV-curing step.

Figure 13:
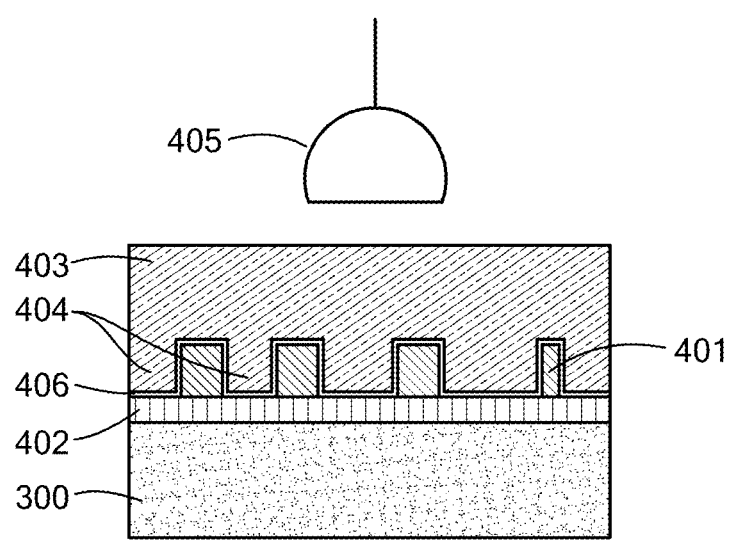
FIG. 13 is a schematic section view showing the second and third steps of the UV-curable method of the present invention being performed on the multilayer structure of FIG. 12.

Referring now to FIG. 13, the second step of the subject UV-light cure method is to press a micromold 403 through layer 301 and/or support layer 402 wherein micropillars 404 of micromold 403 transform layer 301 into layer 401. During this pressing step, micropillars 404 of micromold 403 are pressed through layer 301 so that micropillars 404 contact support layer 402. Alternatively, in the absence of support layer 402, micromold 403 may press through layer 301 so that micropillars 404 contact with carrier layer 300.

Once micromold 403 has pressed layer 301 into layer 401, the third step is to direct UV-light into layer 401 and, optionally, also into support layers 402. Referring still to FIG. 13, UV-light source 405 is turned on, and UV-light is directed through micromold 403, which may be transparent, and support layer 402 into layer 401. Alternatively, UV-light source 405 may be located below carrier layer 300, and the UV-light may then be directed through carrier layer 300, which may be transparent, into layer 401. The UV light is preferably in a wavelength range necessary for absorption by the UV-curing initiator (generally about 300-380 nm). A preferred wavelength of UV light is 340 nm. The UV light at the desired wavelength may be directed into the UV-curable liquid monomer solution for the time necessary to polymerize or solidify the UV-curable liquid monomer solution. A preferred time range for directing the UV light into the UV-curable liquid monomer solution may be about 0.5-60 seconds.

After the UV-curable liquid monomer solution has been cured with the UV light, the fourth step is to remove micromold 403 from the perforated substrate that was formed by the UV-curing method (i.e., the UV-curable liquid monomer solution that was cured with the UV light). Micromold 403 may have a pre-applied release or anti-stick layer 406 (e.g., TEFLON® PTFE, FDTS) to aid in the removal of the perforated substrate from micromold 403.

Figure 14:
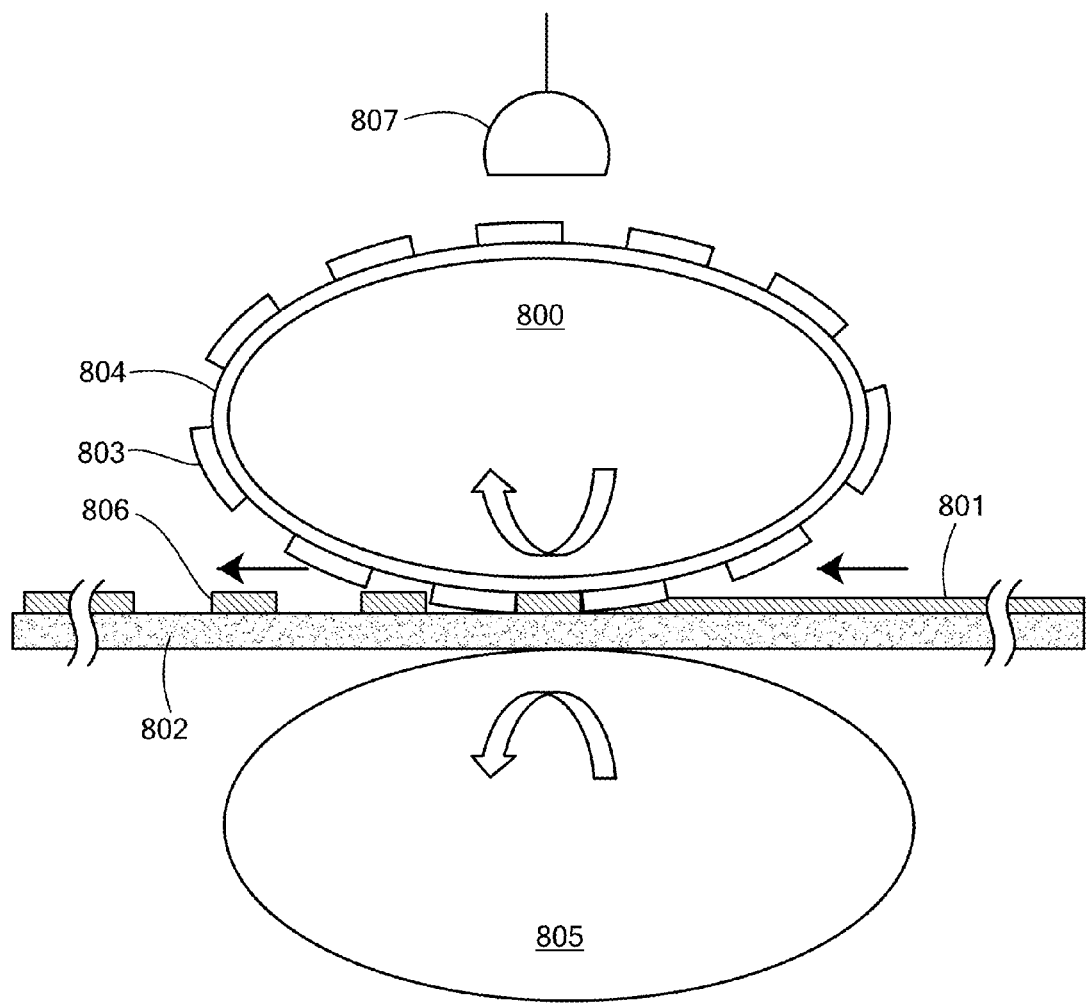
FIG. 14 is a schematic section view showing one embodiment of the continuous UV-curable method of the present invention being performed in a continuous roll-to-roll mode.

In another embodiment, the subject UV-curable method may be performed in a continuous, roll-to-roll fabrication process. Referring now to FIG. 14, a carrier layer 802, similar to carrier layer 300, coated with a layer 801, which may be similar to layer 301, may be fed continuously between a first rotating conveyer 800 and a second rotating conveyer 805. As the layers are fed between the two rotating conveyers 800 and 805, micropillars 803 of micromold 804 press through layer 801 and contact solid carrier layer 802. While micropillars 803 are in contact with carrier 802, UV light source 807 directs UV light into layer 801 located between micropillars 803 wherein the UV-curable liquid monomer solution in that region solidifies into polymer form. A preferred time range for exposing the UV-curable liquid monomer to UV light may be about 0.5-10 seconds. Once the UV-curable monomer solution has polymerized, newly formed perforated substrate 806 and carrier layer 802 exit micromold 804.

As noted above, an alternative method to the foregoing thermal perforation and UV-curable methods is a solvent-based method. This solvent-based method may comprise three steps: (1) depositing a layer of a polymer solution onto a micromold, (2) submerging the micromold in an inversion solvent bath, and (3) removing the resultant perforated substrate from the micromold.

More specifically, the first step of the solvent-based method may comprise depositing a dissolved polymer solution on the micromold. The dissolved polymer solution may comprise at least one polymer dissolved in at least one solvent. The manner of depositing the dissolved polymer solution onto the micromold may comprise, for example, blade coating, rod coating, or slot-die coating. A preferred range of solvent concentration is about 2-50% by weight of the combined weight of the polymer and the solvent.

The second step of the solvent-based method may comprise submerging the micromold coated with the polymer solution in an inversion solvent bath. The inversion solvent may comprise a solvent that does not dissolve the polymer, but is readily miscible with the polymer solvent. A preferred time range for submerging the micromold may be about 0.5-10 seconds, after which the micromold may be removed from the inversion solvent bath.

The third step of the solvent-based method may comprise removing the resultant perforated substrate from the micromold. The micromold may have a pre-applied release or anti-stick layer (e.g., TEFLON® PTFE, FDTS) to aid in the removal of the perforated substrate from the micromold.

Figure 15:
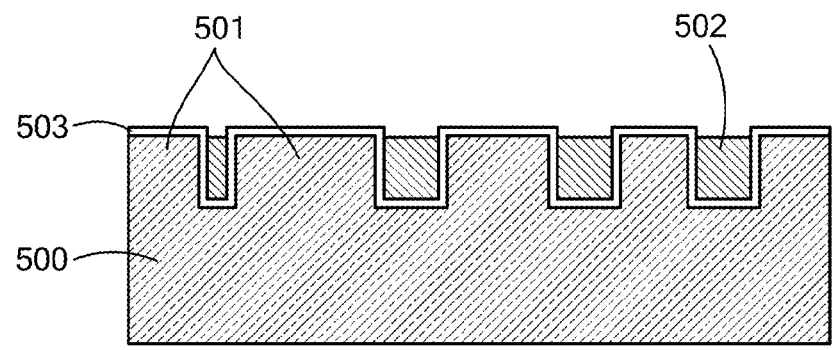
FIG. 15 is a schematic section view of a micromold, with a polymer solution deposited thereonto, in accordance with the solvent-based method of the present invention.

Referring now to FIG. 15, the first step of the foregoing solvent-based method may involve applying a quantity of a dissolved polymer solution 502 to the surface of micromold 500. (A mold release layer 503 may be pre-applied to the surface of micromold 500.) The manner of applying dissolved polymer solution 502 may be, for example, by blade coating, rod coating, or slot-die coating. Dissolved polymer solution 502 may comprise at least one polymer dissolved in a specified concentration of at least one solvent so that, when the micromold 500 with polymer solution 502 is later placed in an inversion solvent bath, the concentration of polymer solvent being displaced is known and the resulting thickness of the polymer can be pre-determined. Examples of solvents suitable for use in dissolved polymer solution 502 may include, but are not limited to, alcohols (e.g., methanol, ethanol, propanol, or higher carbon chain alcohols), polar aprotic solvents (e.g., dimethyl formamide (DMF), N-methyl pyrrolidone (NMP), dimethyl acetamide (DMAc), dimethyl sulfoxide (DMSO)), and non-polar organic solvents (e.g., chloroform, methylene chloride, acetone, acetonitrile). Examples of polymers suitable for use in dissolved polymer solution 502 may comprise any polymers that are soluble in the aforementioned solvents, including, but not limited to, polysulfones, polyphenylene oxide, polyphenylene sulfide, and polyether ether ketones. A preferred range of solvent concentration is about 2-50% by weight.

Figure 16:
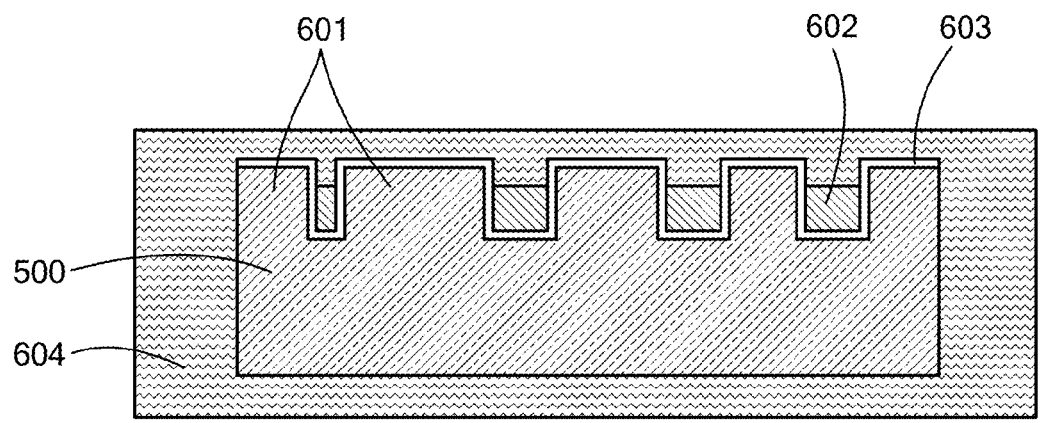
FIG. 16 is a schematic section view of the combination of the micromold and the polymer solution of FIG. 15 submerged in an inversion solvent bath in accordance with the solvent-based method of the present invention.

Referring now to FIG. 16, there is shown the second step of the solvent-based method wherein micromold 500, coated with the polymer solution, is submerged in an inversion solvent bath 604. The solvent that is in the polymer solution readily mixes with the inversion solvent, and the polymer precipitates out, resulting in the formation of perforated substrate 602 on micromold 500. The inversion solvent preferably comprises a solvent that does not dissolve the polymer but is readily miscible with the polymer solvent. The inversion solvent may include, but is not limited to, water and alcohols. In the case of the inversion solvent being an alcohol, the polymer solvent must be non-polar and fully miscible with the inversion solvent alcohol, and the inversion solvent alcohol must not dissolve the polymer. As micromold 500 is submerged in the inversion solvent bath, the polymer solvent readily mixes with the inversion solvent, which leaves behind only the solid polymer on micromold 500. A preferred time range for submerging micromold 500 is about 0.5-10 seconds. After the micromold containing the newly formed perforated substrate 602 is removed from the inversion solvent bath 604, the third step is to remove the perforated substrate 602 from micromold 500. Micromold 500 may have a pre-applied release or anti-stick layer 603 (e.g. TEFLON® PTFE, FDTS) to aid in the removal of perforated substrate 602 from micromold 500.

Figure 17:
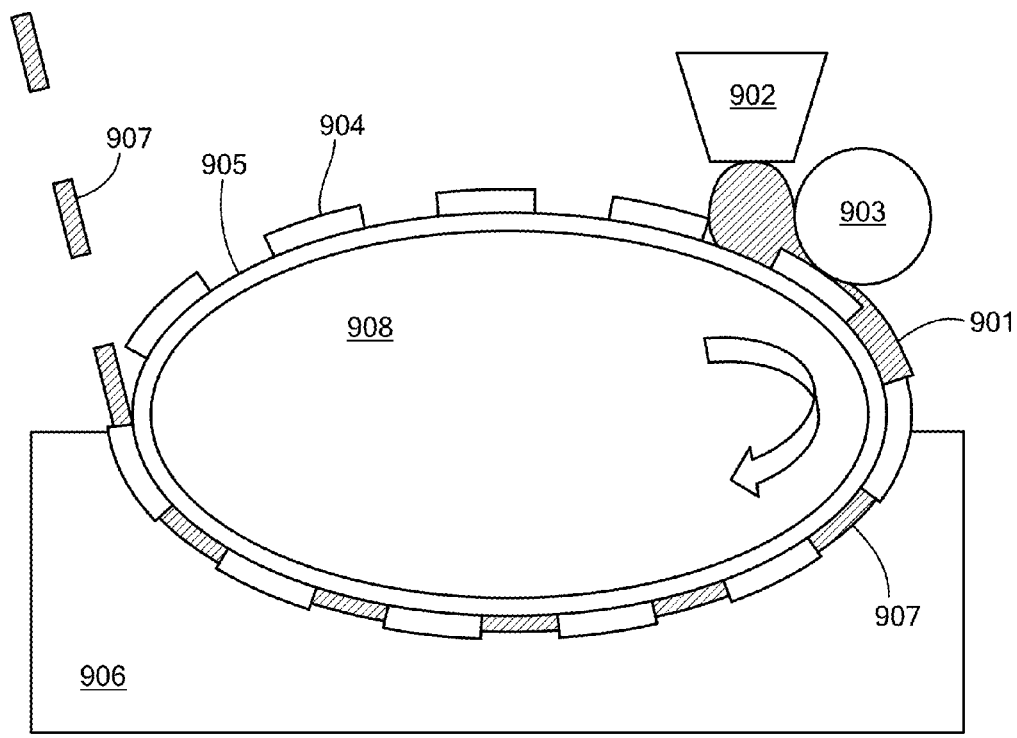
FIG. 17 is a schematic section view showing one embodiment of the continuous solvent-based method of the present invention being performed in a continuous roll-to-roll mode.

In another embodiment, the subject solvent-based method may be performed in a continuous, roll-to-roll fabrication process. Referring to FIG. 17, a quantity of polymer solution 901 is dispensed from a dispenser 902 onto a micromold 905. A bar coater 903 spreads polymer solution 901 to a desired height on micromold 905. As rotating conveyer 908 begins to rotate, micromold 905 is coated with polymer solution 901. As rotating conveyer 908 continues to rotate, micromold 905, coated with polymer solution 901, is submerged in inversion solvent bath 906. As polymer solution 901 is submerged in inversion solvent bath 906, the polymer solvent in polymer solution 901 readily mixes with the inversion solvent in inversion solvent bath 906, which causes the polymer in polymer solution 901 to precipitate and to form a solid polymer in the pattern of micromold 905. Once the polymer in polymer solution 901 has solidified, the thus-formed perforated substrate 907 exits inversion solvent bath 906 and micromold 905.

Figure 18:
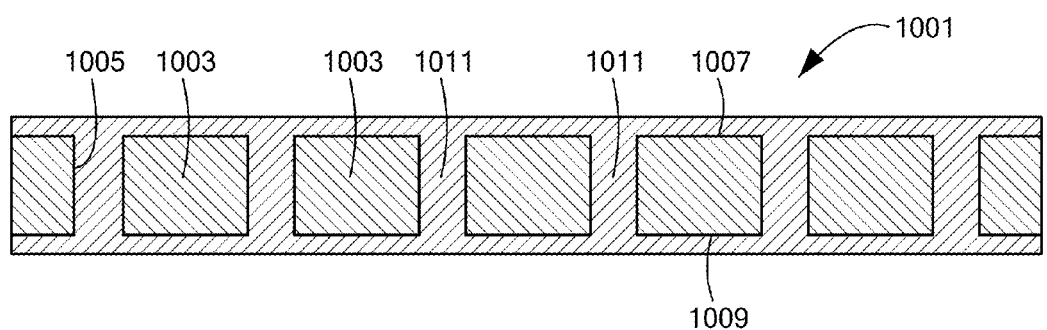
FIG. 18 is a schematic section view of a first embodiment of a solid polymer electrolyte composite membrane constructed according to the teachings of the present invention.

Referring now to FIG. 18, there is shown a schematic section view of a first embodiment of a solid polymer electrolyte composite membrane constructed according to the teachings of the present invention, said solid polymer electrolyte composite membrane being represented generally by reference numeral 1001.

Composite membrane 1001 may comprise a perforated substrate 1003 having a plurality of perforations 1005 extending entirely through perforated substrate 1003 in a direct, i.e., straight-line fashion, from a top surface 1007 to a bottom surface 1009. Perforated substrate 1003 may be prepared, for example, by any of the methods discussed herein, such as the above-described thermal perforation method, the above-described UV-curable method or the above-described solvent-based method.

Composite membrane 1001 may further comprise a solid polymer electrolyte 1011. Solid polymer electrolyte 1011 may partially or completely fill some or all of perforations 1005 and may form a coating on top surface 1007 and/or bottom surface 1009 of perforated substrate 1003. Solid polymer electrolyte 1011 may have a composition similar to that described in U.S. Pat. Nos. 7,947,405 and 7,867,669 and may be applied by a technique described in U.S. Pat. Nos. 7,947,405 and 7,867,669.

The following examples are provided for illustrative purposes only and are in no way intended to limit the scope of the present invention:

Examples 1 and 2: Demonstration of Thermal Perforation of Polysulfone Using Micromolds with Square and Round Micropillars To provide a desired perforated pattern on a substrate, nickel micropillars on a nickel micromold were created using photolithographic development (i.e., using photoresists and 2D masks) followed by electroplating replication. In these two examples, the shapes of the micropillars created on the micromold were square and round. For both cases using micromolds with square micropillars and round micropillars, a thin film of polysulfone (PSU) was deposited on the carrier (PET or polyimide). In both cases, the PSU layer comprised the substrate layer. Once the PSU layer was deposited, the nickel micromold was pressed against the PSU layer at a pressure between 300-500 psi. The temperature of the system was then increased from ambient temperature to a peak temperature above the glass transition temperature of PSU, held at the peak temperature for approximately 5 minutes, and then the temperature was decreased back to ambient temperature. Once the system was back at ambient temperature, the pressure was released and the PSU was removed from the micromold.

Figure 19:
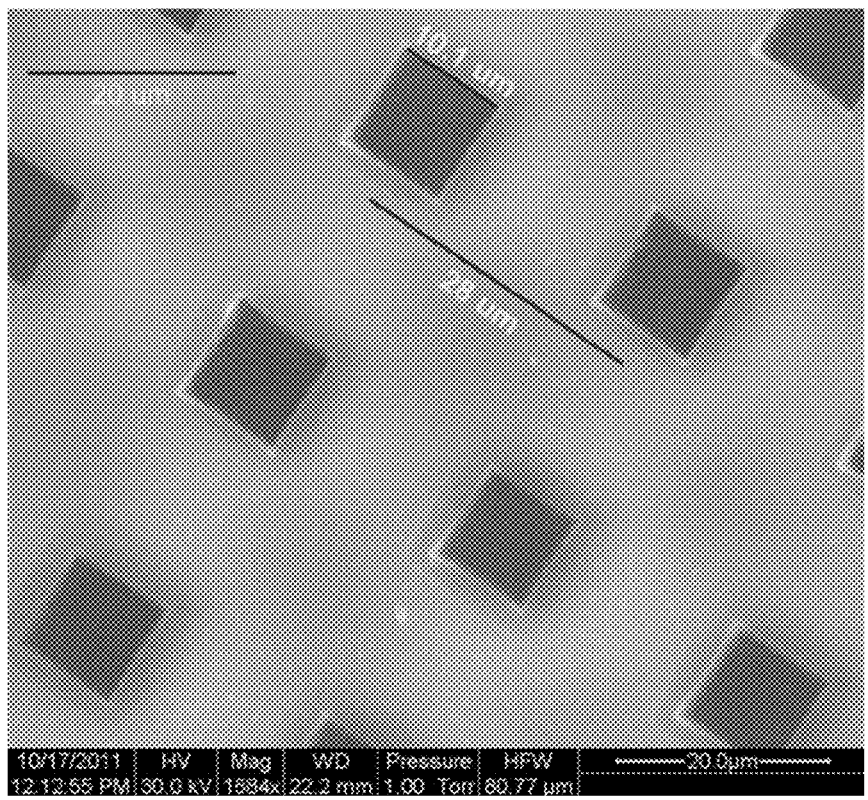
FIG. 19 is an SEM top view image of a perforated substrate with square perforations fabricated using the thermal perforation method of the present invention.
Figure 20:
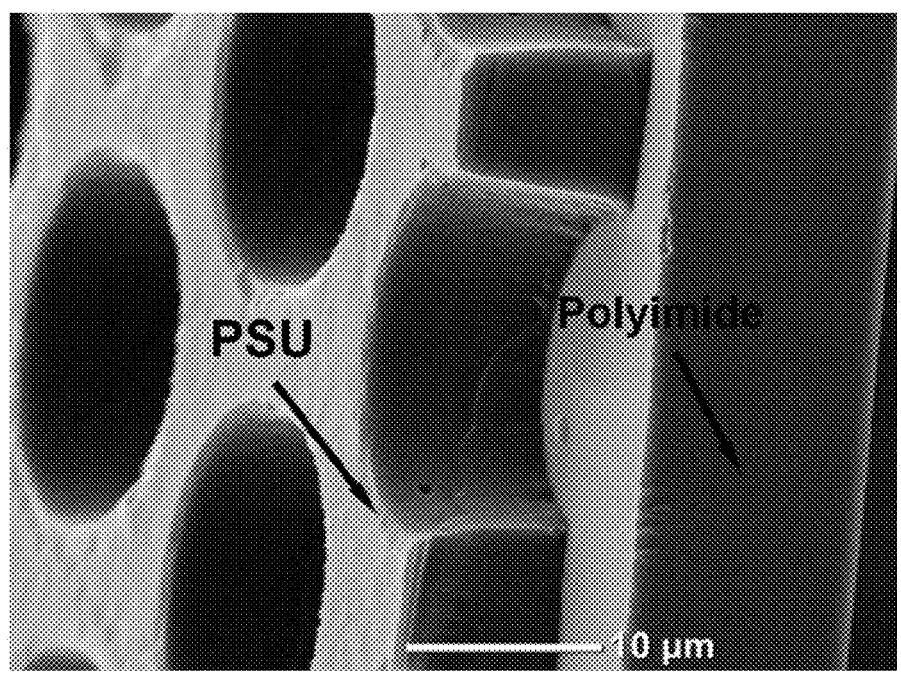
FIG. 20 is an SEM perspective view image of a perforated substrate (on polyimide) with round perforations fabricated using the thermal perforation method of the present invention.
Figure 21:
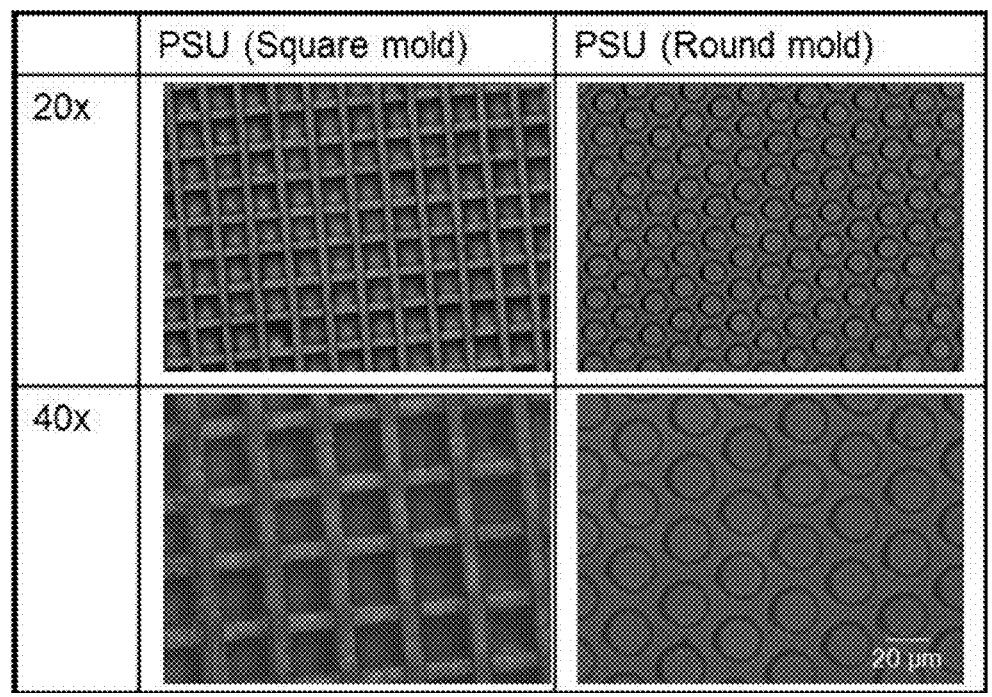
FIG. 21 are side-by-side optical micrograph top view images (20× and 40× magnification) of perforated substrates with square and round perforations fabricated using the thermal perforation method of the present invention.

FIG. 19 shows an SEM micrograph of an 8.5 µm thick PSU substrate with 35% porosity that was thermally perforated using a micromold with square micropillars. For perforation of a PSU layer using a micromold with round micropillars, FIG. 20 shows the SEM micrograph for the perforated 10 µm thick PSU substrate (on polyimide). FIG. 21 shows a comparison of the thermally-perforated PSU substrate using a micromold with square micropillars and a micromold using round micropillars (at 20× and 40× magnification).

Figure 22:
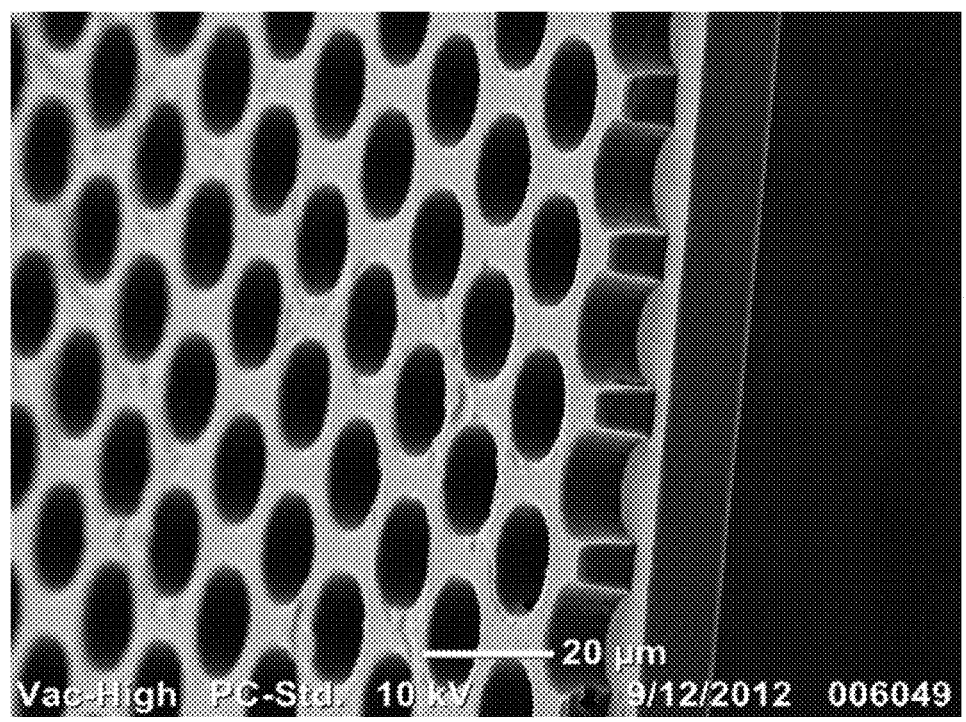
FIG. 22 is an SEM perspective view image of a perforated substrate (on polyimide) with round perforations fabricated using the UV-curable method of the present invention.

Example 3: Demonstration of UV-Curable
Perforation of Polysulfone Using Micromolds The same method for creating the micromolds used in Examples 1 and 2 was used to create the micromolds with round micropillars for this UV-curable example. A UV-curable liquid monomer solution comprising acrylate liquid monomer (i.e. 1-Hydroxy-cyclohexyl-phenyl-ketone) with ~2% initiator [i.e. Phenylbis(2,4,6-trimethylbenzoyl)-phosphine oxide)], was blade-coated onto a MYLAR® stretched PET carrier layer. Next, the micromold was pressed against the UV-curable liquid monomer solution (at 150 psi), and UV light (350 nm wavelength) was focused on the UV-curable liquid monomer solution for one minute to form the polymer electrolyte membrane substrate (i.e. poly-1-Hydroxy-cyclohexyl-phenyl-ketone). FIG. 22 shows the resulting perforated substrate (10 um thickness, 20 um dia. holes) on the MYLAR® stretched PET carrier layer.

Figure 23:
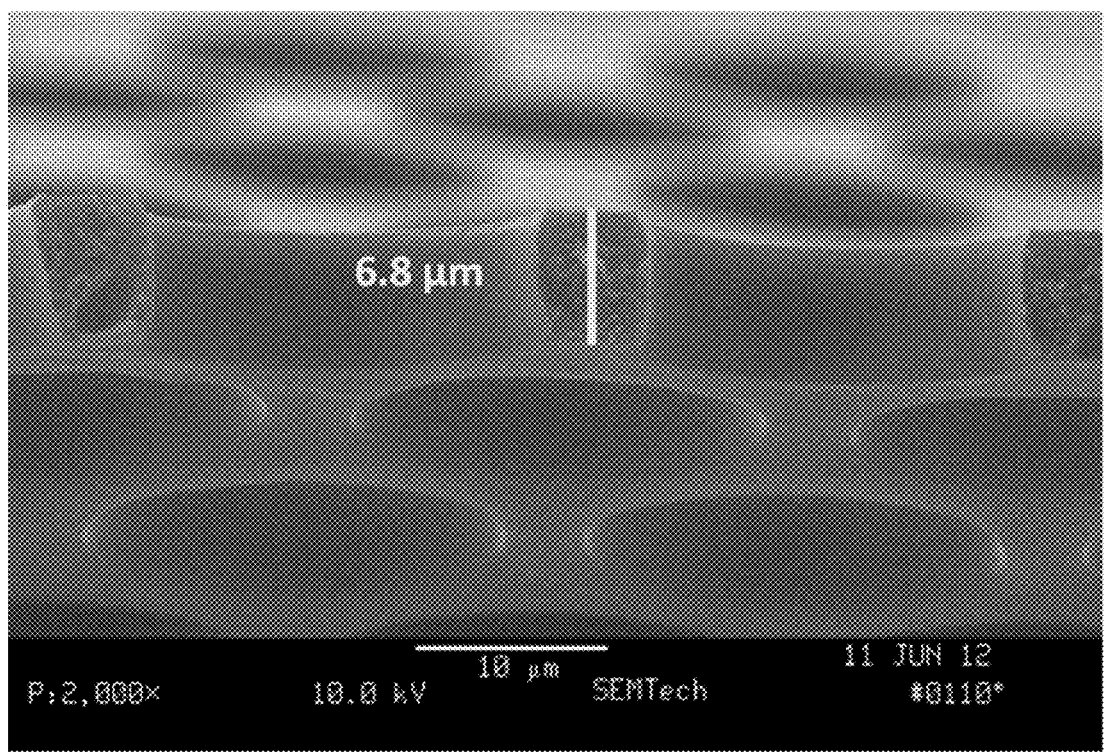
FIG. 23 is an SEM cross-sectional image (2000× magnification) of a perforated substrate with round perforations fabricated using the solvent-based method of the present invention.

Example 4: Demonstration of Solvent-Based
Perforation of Polysulfone Using Micromolds The same method for creating the micromolds used in Examples 1-3 was used to create a micromold with round micropillars for this solvent-based example. First, a polymer solution consisting of 30% by weight of PSU dissolved in N-methyl pyrrolidone (NMP) was bar coated over the surface of the micromold to fill the voids between the micropillars of the micromold. The micromold was then placed in an inversion solvent bath (in this case, the inversion solvent was water), and the PSU precipitated out of the polymer solution leaving a perforated PSU film on the micromold. FIG. 23 shows an SEM micrograph of the resulting perforated 6.8 μm thick PSU film.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:
1. A method of preparing a perforated substrate, the method comprising the steps of:
  (a) providing a layer of material, wherein the layer of material is a solid layer of material, the solid layer of material having a glass transition temperature; and then
  (b) using a micromold to form at least one perforation extending entirely through the layer of material, the micromold comprising at least one micropillar, the micropillar having a diameter of about 1-150 microns, wherein said micromold using step comprises pressing the at least one micropillar through the solid layer of material and heating the solid layer of material to a temperature above the glass transition temperature of the solid material, whereby a perforated substrate is formed.
2. The method as claimed in claim 1 wherein the at least one micropillar has a height of about 1-200 microns.
3. The method as claimed in claim 1 wherein the micromold has a micropillar density of about 20-60%.
4. The method as claimed in claim 1 wherein the micromold comprises a plurality of micropillars, each of the micropillars having a diameter of about 1-150 microns and a height of about 1-200 microns, and wherein the micromold has a micropillar density of about 20-60%.
5. The method as claimed in claim 1 wherein the solid layer of material is selected from a thermoplastic material and a thermoset material.
6. The method as claimed in claim 5 wherein said providing step comprises casting or laminating the solid layer of material onto a carrier.
7. The method as claimed in claim 6 wherein the solid layer of material has a thickness of about 1-200 microns.
8. The method as claimed in claim 7 wherein the carrier has a glass transition temperature and wherein the glass transition temperature of the carrier is higher than the glass transition temperature of the solid layer of material so that the carrier does not flow and/or combine with the solid layer of material during said heating.
9. The method as claimed in claim 6 wherein the solid layer of material is directly on top of the carrier.
10. The method as claimed in claim 6 wherein the providing step comprises casting or laminating one or more support layers onto the carrier under the solid layer of material.
11. The method as claimed in claim 10 wherein the one or more support layers has a total thickness of about 1-50 microns.
12. The method as claimed in claim 1 wherein said pressing comprises pressing the at least one micropillar through the solid layer of material at a pressure of about 250-350 psi.
13. The method as claimed in claim 1 wherein the micromold using step further comprises decreasing the temperature to a temperature below the glass transition temperature of the solid layer of material while the at least one micropillar is pressed through the solid layer of material.
14. The method as claimed in claim 13 wherein the micromold using step further comprises removing the micromold from the solid layer of material.
15. The method as claimed in claim 5 wherein the thermoplastic material is selected from the group consisting of polysulfone, polyether sulfone, polystyrene, polyphenylene oxide, polycarbonate, polyphenylene sulfide, polyether ether ketone, polyamides (nylon), polyimides, acrylonitrile-butadiene-styrene copolymers (ABS), poly(methyl methacrylate), polyethylene, polypropylene, poly vinyl chloride, poly vinyl alcohol, fluorocarbon elastomers and fluorine based resins.
16. The method as claimed in claim 5 wherein the thermoset material is selected from the group consisting of polyimide, polyether imide, polyisoprene, pre-vulcanized rubber, and polyurethanes.
17. The method as claimed in claim 1 wherein said providing and using steps are performed batch-wise.
18. The method as claimed in claim 1 wherein said providing and using steps are performed as part of a continuous, roll-to-roll process.
19. A method of preparing a perforated substrate, the method comprising the steps of:
  (a) providing a layer of material, wherein the layer of material is a layer of a UV-curable liquid monomer solution; and
  (b) using a micromold to form at least one perforation extending entirely through the layer of material, the micromold comprising at least one micropillar, wherein the micromold using step comprises causing the UV-curable liquid monomer solution to cure while pressing the at least one micropillar through the layer of the UV-curable liquid monomer solution, whereby a perforated substrate is formed.

20. The method as claimed in claim 19 wherein the providing step comprises depositing the layer of UV-curable liquid monomer solution onto a carrier.

21. The method as claimed in claim 19 wherein the UV-curable liquid monomer solution comprises a liquid monomer and a UV-curing initiator.

22. The method as claimed in claim 21 wherein the liquid monomer is at least one member selected from the group consisting of acrylates, thiol-enes, epoxy acrylates, epoxy silicon, polyimide precursors, urethane acrylates, and fluoroacrylates and wherein the UV-curing initiator is at least one member selected from the group consisting of phenones, ethanones, phenyl ketones, and phosphineoxides.

23. The method as claimed in claim 19 wherein the layer of the UV-curable liquid monomer solution has a thickness of about 1-200 microns.

24. The method as claimed in claim 19 wherein the providing step comprises depositing one or more support layers onto a carrier and then depositing the UV-curable liquid monomer solution onto the one or more support layers.

25. The method as claimed in claim 24 wherein the one or more support layers have a total thickness of about 1-50 microns.

26. The method as claimed in claim 19 wherein the micromold is a UV-transparent micromold and wherein said curing step comprises curing the UV-curable liquid monomer solution with UV light directed into the UV-curable liquid monomer solution through the UV-transparent micromold.

27. The method as claimed in claim 20 wherein the carrier is a UV-transparent carrier and wherein said curing step comprises curing the UV-curable liquid monomer solution with UV light directed into the UV-curable liquid monomer solution through the UV-transparent carrier.

28. The method as claimed in claim 19 wherein said micromold using step further comprises removing the micromold from the perforated substrate.

29. The method as claimed in claim 19 wherein said providing and using steps are performed batch-wise.

30. The method as claimed in claim 19 wherein said providing and using steps are performed as part of a continuous, roll-to-roll process.

31. A method of preparing a solid polymer electrolyte composite membrane, the method comprising the steps of:
    (a) preparing a perforated substrate as claimed in claim 1; and
    (b) at least partially filling the at least one perforation with a solid polymer electrolyte.

32. A method of preparing a solid polymer electrolyte composite membrane, the method comprising the steps of:
    (a) preparing a perforated substrate as claimed in claim 19; and
    (b) at least partially filling the at least one perforation with a solid polymer electrolyte.

33. The method as claimed in claim 19 wherein the micropillar has a diameter of about 1-150 microns.

34. A method of preparing a perforated substrate, the method comprising the steps of:
    (a) providing a solid layer of material, the solid layer of material having a glass transition temperature;
    (b) providing a micromold, the micromold comprising at least one micropillar;
    (c) pressing the at least one micropillar of said micromold through the solid layer of material;
    (d) heating the solid layer of material to a temperature above the glass transition temperature while under pressure from the micromold;
    (e) then, cooling the solid layer of material while under pressure from the micromold; and
    (f) removing the micromold from the solid layer of material, whereby at least one open perforation extending entirely through the solid layer of material is formed.

* * * * *